United States Patent
Lundvall et al.

(10) Patent No.: US 9,424,055 B2
(45) Date of Patent: *Aug. 23, 2016

(54) MULTI-FUNCTION INSTRUCTION THAT DETERMINES WHETHER FUNCTIONS ARE INSTALLED ON A SYSTEM

(71) Applicant: International Business Machines Corporation, Armonk, NY (US)

(72) Inventors: Shawn D. Lundvall, Poughkeepsie, NY (US); Ronald M. Smith, Sr., Wappingers Falls, NY (US); Phil Chi-Chung Yeh, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 326 days.

This patent is subject to a terminal disclaimer.

(21) Appl. No.: 14/144,830

(22) Filed: Dec. 31, 2013

(65) Prior Publication Data

US 2014/0114641 A1    Apr. 24, 2014

Related U.S. Application Data

(60) Continuation of application No. 13/487,929, filed on Jun. 4, 2012, now Pat. No. 8,661,231, which is a continuation of application No. 13/324,396, filed on Dec. 13, 2011, now Pat. No. 8,261,048, which is a (Continued)

(51) Int. Cl.
    *G06F 9/30*    (2006.01)
    *G06F 9/34*    (2006.01)
    (Continued)

(52) U.S. Cl.
    CPC ........ *G06F 9/45504* (2013.01); *G06F 9/30007* (2013.01); *G06F 9/3017* (2013.01); *G06F 9/30018* (2013.01); *G06F 9/30094* (2013.01); *G06F 9/30181* (2013.01);
    (Continued)

(58) Field of Classification Search
    CPC   G06F 9/45504; G06F 9/30094; G06F 9/3017
    See application file for complete search history.

(56) References Cited

U.S. PATENT DOCUMENTS

| 4,578,530 A | 3/1986 | Zeidler |
| 5,058,164 A | 10/1991 | Elmer et al. ................... 713/190 |

(Continued)

FOREIGN PATENT DOCUMENTS

| EP | 0354774 A2 | 8/1989 | ................ H04L 9/00 |
| GB | 1494750 A1 | 12/1977 | |

(Continued)

OTHER PUBLICATIONS zArchitecture, Principles of Operation, First Edition, Dec. 2000, SA22-7832-00, pp. 309-473.

(Continued)

*Primary Examiner* — Benjamin Geib
(74) *Attorney, Agent, or Firm* — Fleit Gibbons Gutman Bongini Bianco PL; Jon Gibbons

(57) ABSTRACT

A method, system and program product for executing a multi-function instruction in an emulated computer system by specifying, via the multi-function instruction, either a capability query or execution of a selected function of one or more optional functions, wherein the selected function is an installed optional function, wherein the capability query determines which optional functions of the one or more optional functions are installed on the computer system.

10 Claims, 12 Drawing Sheets

Related U.S. Application Data continuation of application No. 11/692,382, filed on Mar. 28, 2007, now Pat. No. 8,103,860, which is a division of application No. 10/435,916, filed on May 12, 2003, now Pat. No. 7,257,718.

(51) Int. Cl.
  *G06F 9/45* (2006.01)
  *G06F 21/72* (2013.01)
  *H04L 9/08* (2006.01)
  *G06F 9/455* (2006.01)

(52) U.S. Cl.
  CPC ............... *G06F 9/342* (2013.01); *G06F 21/72* (2013.01); *H04L 9/08* (2013.01)

(56) References Cited

U.S. PATENT DOCUMENTS

| | | | |
|---|---|---|---|
| 5,666,411 A | 9/1997 | McCarty | |
| 5,765,030 A | 6/1998 | Nachenberg et al. | 714/33 |
| 5,787,302 A | 7/1998 | Hampapuram et al. | |
| 6,298,442 B1 | 10/2001 | Kocher et al. | 713/194 |
| 6,393,487 B2 | 5/2002 | Boucher et al. | 709/238 |
| 6,542,981 B1 | 4/2003 | Zaidi et al. | 712/2 |
| 6,675,298 B1 | 1/2004 | Folmsbee | 713/190 |
| 6,765,030 B2 | 7/2004 | DeSimone et al. | |
| 6,996,725 B2 | 2/2006 | Ma et al. | 726/22 |
| 7,136,488 B2 | 11/2006 | Hashimoto et al. | 380/277 |
| 2001/0029577 A1 | 10/2001 | Worrell et al. | |
| 2002/0184046 A1 | 12/2002 | Kamada et al. | 705/1 |
| 2002/0191790 A1 | 12/2002 | Anand et al. | 380/255 |
| 2002/0191793 A1 | 12/2002 | Anand et al. | 380/255 |
| 2003/0002666 A1 | 1/2003 | Takahashi | |
| 2003/0028765 A1 | 2/2003 | Cromer et al. | |
| 2003/0033537 A1 | 2/2003 | Fujimoto et al. | 713/193 |
| 2003/0140240 A1 | 7/2003 | Jaffe et al. | 713/193 |
| 2003/0163718 A1 | 8/2003 | Johnson et al. | 713/193 |
| 2004/0117599 A1 | 6/2004 | Mittal et al. | 712/210 |

FOREIGN PATENT DOCUMENTS

| | | |
|---|---|---|
| JP | PUPA 5093054 A1 | 7/1975 |
| JP | PUPA 56-121138 A1 | 9/1981 |
| JP | 56149645 A1 | 11/1981 |
| JP | PUPA 11-249873 A1 | 9/1999 |
| WO | WO 01/11818 A2 | 8/1999 |

OTHER PUBLICATIONS

IBM PCI Cryptographic Coprocessor CCA Basic Services Reference and Guide for IBM 4758 Models 002 and 003 with Release 2.40, Sep. 2001, http://www.zone-h.org/files/33/CCA_Basic_Services_240.pdf; pp. 1-1 through 2-18; 6-1 through 6-16; 7-1 through 7-24; B-1 through B-42; F-1 through F-4.

"CryptoManiac: A Fast Flexible Architecture for Secure Communication", Wu et al., Proceedings of the 28th International Symposium on Computer Architecture, 2001.

"The Microarchitecture of the IBM eServer z900 Processor", Schwarz et al., IBM J. Res. & Dev., vol. 46, No. 4/5, Jul./Sep. 2002, pp. 381-395.

"Computer Architecture and Organization", 2nd Edition, John P. Hayes, McGraw-Hill Book Company, pp. 52-54; 198-201, Publication date: 1988.

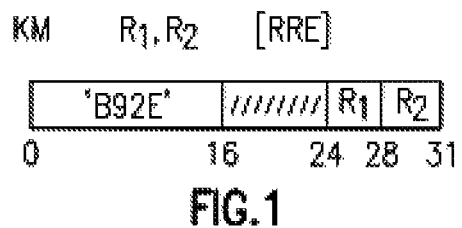
FIG.1
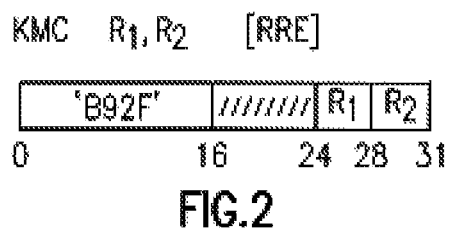
FIG.2
| CODE | FUNCTION | PARM. BLOCK SIZE (BYTES) | DATA BLOCK SIZE (BYTES) |
|---|---|---|---|
| 0 | KM-QUERY | 16 | — |
| 1 | KM-DEA | 8 | 8 |
| 2 | KM-TDEA-128 | 16 | 8 |
| 3 | KM-TDEA-192 | 24 | 8 |
| EXPLANATION: — NOT APPLICABLE | | | |
FIG.3

FIG. 4
| CODE | FUNCTION | PARM. BLOCK SIZE (BYTES) | DATA BLOCK SIZE (BYTES) |
|---|---|---|---|
| 0 | KMC-QUERY | 16 | — |
| 1 | KMC-DEA | 16 | 8 |
| 2 | KMC-TDEA-128 | 24 | 8 |
| 3 | KMC-TDEA-192 | 32 | 8 |
EXPLANATION:
— NOT APPLICABLE
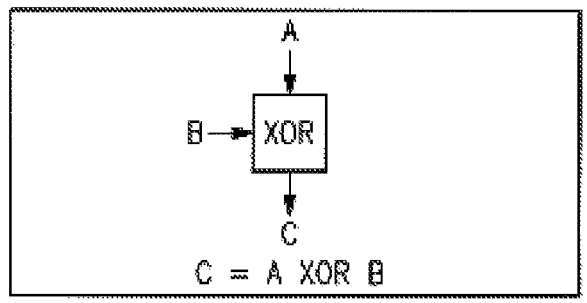
FIG. 6
Prior Art
C = A XOR B
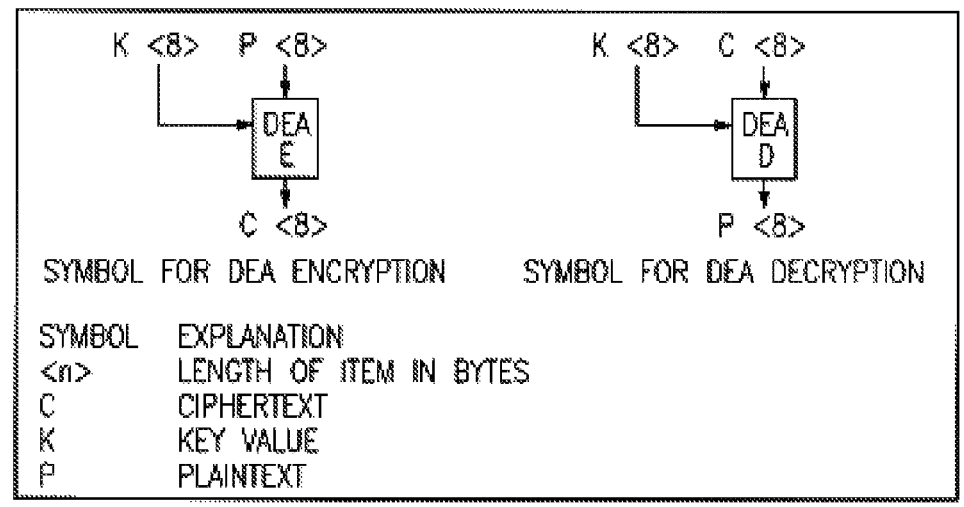
SYMBOL FOR DEA ENCRYPTION       SYMBOL FOR DEA DECRYPTION
SYMBOL   EXPLANATION
<n>      LENGTH OF ITEM IN BYTES
C        CIPHERTEXT
K        KEY VALUE
P        PLAINTEXT
FIG. 7
Prior Art

FIG.15
Prior Art
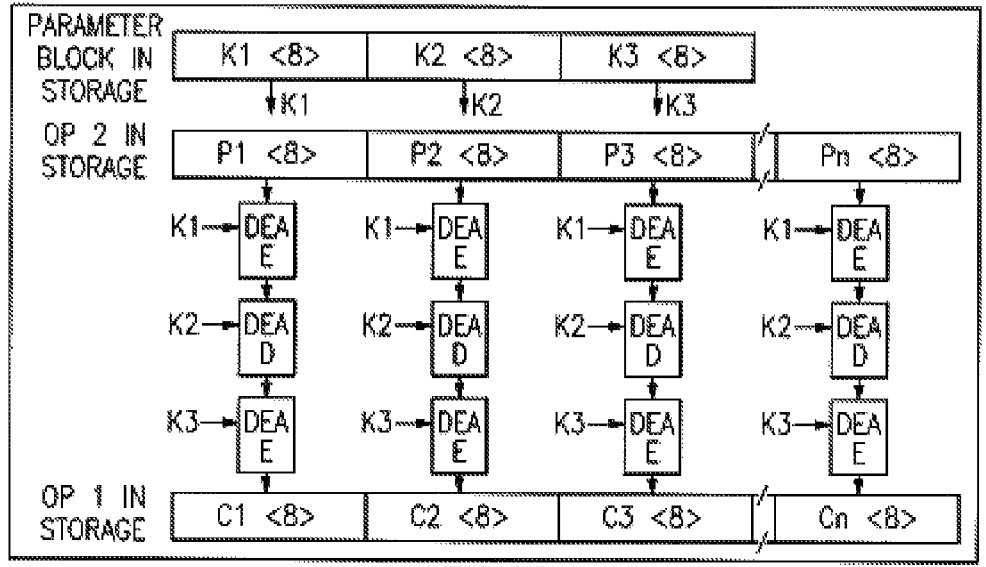
FIG.16
Prior Art
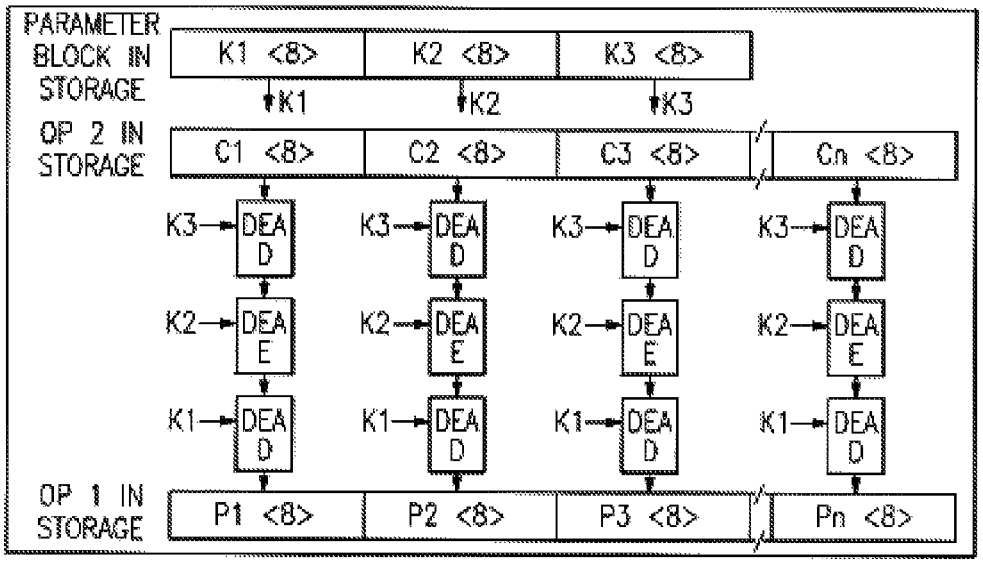
FIG.17
Prior Art

| | |
|---|---|
| 1.–6. | EXCEPTIONS WITH THE SAME PRIORITY AS THE PRIORITY OF PROGRAM-INTERRUPTION CONDITIONS FOR THE GENERAL CASE. |
| 7.A | ACCESS EXCEPTIONS FOR SECOND INSTRUCTION HALFWORD. |
| 7.B | OPERATION EXCEPTION. |
| 8. | SPECIFICATION EXCEPTION DUE TO INVALID FUNCTION CODE OR INVALID REGISTER NUMBER. |
| 9. | SPECIFICATION EXCEPTION DUE TO INVALID OPERAND LENGTH. |
| 10. | CONDITION CODE 0 DUE TO SECOND-OPERAND LENGTH ORIGINALLY ZERO. |
| 11. | ACCESS EXCEPTIONS FOR AN ACCESS TO THE PARAMETER BLOCK, FIRST, OR SECOND OPERAND. |
| 12. | CONDITION CODE 0 DUE TO NORMAL COMPLETION (SECOND-OPERAND LENGTH ORIGINALLY NONZERO, BUT STEPPED TO ZERO). |
| 13. | CONDITION CODE 3 DUE TO PARTIAL COMPLETION (SECOND-OPERAND LENGTH STILL NONZERO). |

FIG.28

MULTI-FUNCTION INSTRUCTION THAT DETERMINES WHETHER FUNCTIONS ARE INSTALLED ON A SYSTEM

CROSS-REFERENCE TO RELATED APPLICATION

This is a continuation of U.S. patent application Ser. No. 13/487,929 entitled "MULTI-FUNCTION INSTRUCTION THAT DETERMINES WHETHER FUNCTIONS ARE INSTALLED ON A SYSTEM", now U.S. Pat. No. 8,661,231, filed Jun. 4, 2012, and assigned to International Business Machines Corporation, which is a continuation of U.S. patent application Ser. No. 13/324,396 entitled "OPTIONAL FUNCTION MULTI-FUNCTION INSTRUCTION IN AN EMULATED COMPUTING ENVIRONMENT", now U.S. Pat. No. 8,261,048, filed Dec. 13, 2011, and assigned to International Business Machines Corporation, which is a continuation of U.S. patent application Ser. No. 11/692,382 entitled "OPTIONAL FUNCTION MULTI-FUNCTION INSTRUCTION", now U.S. Pat. No. 8,103,860, filed Mar. 28, 2007, and assigned to International Business Machines Corporation, which is a divisional of U.S. patent application Ser. No. 10/435,916 entitled "CIPHER MESSAGE ASSIST INSTRUCTIONS", now U.S. Pat. No. 7,257,718 filed May 12, 2003, and assigned to International Business Machines Corporation.

Also this patent is related to U.S. Pat. No. 7,770,220, entitled "CIPHER MESSAGE ASSIST INSTRUCTION" filed Feb. 27, 2009, and assigned to International Business Machines Corporation, which is a continuation of U.S. patent application Ser. No. 11/692,382 entitled "OPTIONAL FUNCTION MULTI-FUNCTION INSTRUCTION", now U.S. Pat. No. 8,103,860 filed Mar. 28, 2007, and assigned to International Business Machines Corporation, which is a divisional of U.S. Pat. No. 7,257,718 entitled "CIPHER MESSAGE ASSIST INSTRUCTIONS" filed May 12, 2003, and assigned to International Business Machines Corporation.

The disclosure of each of the forgoing patents and patent applications are incorporated herein by reference in their entirety.

BACKGROUND OF THE INVENTION

This invention relates to computer system architecture and particularly to new instructions which augment the IBM z/Architecture and can be emulated by other architectures.

Before our invention IBM has created through the work of many highly talented engineers beginning with machines known as the IBM System 360 in the 1960s to the present, a special architecture which, because of its essential nature to a computing system, became known as "the mainframe" whose principles of operation state the architecture of the machine by describing the instructions which may be executed upon the "mainframe" implementation of the instructions which had been invented by IBM inventors and adopted, because of their significant contribution to improving the state of the computing machine represented by "the mainframe", as significant contributions by inclusion in IBM's Principles of Operation as stated over the years. The First Edition of the z/Architecture Principles of Operation which was published December, 2000 has become the standard published reference as SA22-7832-00. We determined that further new instructions would assist the art and could be included in a z/Architecture machine and also emulated by others in simpler machines, as described herein.

BRIEF SUMMARY OF THE INVENTION

It is a primary object of the present invention to provide CPU-synchronous, problem-state, and sectioning instructions for enciphering and deciphering locations in computer storage.

It is another object of the present invention to provide an instruction which provides the encryption key for performing the enciphering or deciphering operation.

It is another object of the present invention to provide an instruction which specifies the memory to be enciphered or deciphered.

It is another object of the present invention to provide an instruction which enciphers or deciphers a plurality of memory locations in a chaining operation.

It is another object of the present invention to provide for enciphering or deciphering memory locations by emulating another computer system which executes the instruction.

BRIEF DESCRIPTION OF THE SEVERAL VIEWS OF THE DRAWING

These and other objects will be apparent to one skilled in the art from the following detailed description of the invention taken in conjunction with the accompanying drawings in which:

FIG. 1 is the Cipher Message (KM) instruction in the RE instruction format;

FIG. 2 is the Cipher Message with Chaining (FMC) instruction in the RE instruction format;

FIG. 3 is a table showing the function codes for the Cipher Message instruction of FIG. 1;

FIG. 4 is a table showing the function codes for the Cipher Message with Chaining instruction of FIG. 2;

FIG. 6 illustrates the symbol for the Bit-Wise Exclusive Or according to Prior Art;

FIG. 7 illustrates the symbols for DEA Encryption and Decryption according to Prior Art;

FIG. 15 illustrates the format for the parameter block for KM-TDEA-192 according to Prior Art;

FIG. 16 illustrates the KM-TDEA-192 Encipher Operation according to Prior Art;

FIG. 17 illustrates the KM-TDEA-192 Decipher Operation according to Prior Art;

FIG. 25 illustrates the format for the parameter block for KMC-TDEA-128 according to Prior Art;

FIG. 28 is a table showing the priority of execution of KM and KMC;

DETAILED DESCRIPTION OF THE INVENTION

Figure 5:
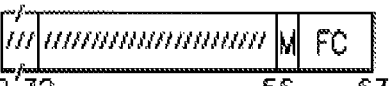
FIG. 5 is a representation of the general register assignments for the KM and FMC instructions.

The CIPHER MESSAGE (KM) instruction and the CIPHER MESSAGE WITH CHAINING (KMC) instruction will first be discussed, followed by a discussion of the preferred computer system for executing these instructions. In the alternative, a second preferred computer system which emulates another computer system for executing these instructions will be discussed.

Cipher Message (KM)

FIG. 1 is the Cipher Message (KM) instruction in the RRE instruction format.

Cipher Message with Chaining (KMC)

FIG. 2 is the Cipher Message with Chaining (KMC) instruction in the RRE instruction format.

A function specified by the function code in general register 0 is performed.

Bits 16-23 of the instruction are ignored. Bit positions 57-63 of general register 0 contain the function code. FIGS. 3 and 4 show the assigned function codes for CIPHER MESSAGE and CIPHER MESSAGE WITH CHAINING, respectively. All other function codes are unassigned. For cipher functions, bit 56 is the modifier bit which specifies whether an encryption or a decryption operation is to be performed. The modifier bit is ignored for all other functions. All other bits of general register 0 are ignored. General register 1 contains the logical address of the leftmost byte of the parameter block in storage. In the 24-bit addressing mode, the contents of bit positions 40-63 of general register 1 constitute the address, and the contents of bit positions 0-39 are ignored. In the 31-bit addressing mode, the contents of bit positions 33-63 of general register 1 constitute the address, and the contents of bit positions 0-32 are ignored.

In the 64-bit addressing mode, the contents of bit positions 0-63 of general register 1 constitute the address.

The function codes for CIPHER MESSAGE are shown in FIG. 3.

The function codes for CIPHER MESSAGE WITH CHAINING are shown in FIG. 4.

All other function codes are unassigned. The query function provides the means of indicating the availability of the other functions. The contents of general registers R1, R2, and R1+1 are ignored for the query function.

For all other functions, the second operand is ciphered as specified by the function code using a cryptographic key in the parameter block, and the result is placed in the first-operand location. For CIPHER MESSAGE WITH CHAINING, ciphering also uses an initial chaining value in the parameter block, and the chaining value is updated as part of the operation.

The R1 field designates a general register and must designate an even-numbered register; otherwise, a specification exception is recognized.

The R2 field designates an even-odd pair of general registers and must designate an even-numbered register; otherwise, a specification exception is recognized.

The location of the leftmost byte of the first and second operands is specified by the contents of the R1 and R2 general registers, respectively. The number of bytes in the second-operand location is specified in general register R2+1. The first operand is the same length as the second operand.

As part of the operation, the addresses in general registers R1 and R2 are incremented by the number of bytes processed, and the length in general register R2+1 is decremented by the same number. The formation and updating of the addresses and length is dependent on the addressing mode.

In the 24-bit addressing mode, the contents of bit positions 40-63 of general registers R1 and R2 constitute the addresses of the first and second operands, respectively, and the contents of bit positions 0-39 are ignored; bits 40-63 of the updated addresses replace the corresponding bits in general registers R1 and R2, carries out of bit position 40 of the updated address are ignored, and the contents of bit positions 32-39 of general registers R1 and R2 are set to zeros. In the 31-bit addressing mode, the contents of bit positions 33-63 of general registers R1 and R2 constitute the addresses of the first and second operands, respectively, and the contents of bit positions 0-32 are ignored; bits 33-63 of the updated addresses replace the corresponding bits in general registers R1 and R2, carries out of bit position 33 of the updated address are ignored, and the content of bit position 32 of general registers R1 and R2 is set to zero. In the 64-bit addressing mode, the contents of bit positions 0-63 of general registers R1 and R2 constitute the addresses of the first and second operands, respectively; bits 0-63 of the updated addresses replace the contents of general registers R1 and R2, and carries out of bit position 0 are ignored.

In both the 24-bit and the 31-bit addressing modes, the contents of bit positions 32-63 of general register R2+1 form a 32-bit unsigned binary integer which specifies the number of bytes in the first and second operands, and the contents of bit positions 0-31 are ignored; bits 32-63 of the updated value replace the corresponding bits in general register R2+1. In the 64-bit addressing mode, the contents of bit positions 0-63 of general register R2+1 form a 64-bit unsigned binary integer which specifies the number of bytes in the first and second operands; and the updated value replaces the contents of general register R2+1.

In the 24-bit or 31-bit addressing mode, the contents of bit positions 0-31 of general registers R1, R2, and R2+1, always remain unchanged. FIG. 5 shows the contents of the general registers just described.

In the access-register mode, access registers 1, R1, and R2 specify the address spaces containing the parameter block, first, and second operands, respectively.

The result is obtained as if processing starts at the left end of both the first and second operands and proceeds to the right, block by block. The operation is ended when the number of bytes in the second operand as specified in general register R2+1 have been processed and placed at the first-operand location (called normal completion) or when a CPU-determined number of blocks that is less than the length of the second operand have been processed (called partial completion). The CPU-determined number of blocks depends on the model, and may be a different number each time the instruction is executed. The CPU-determined number of blocks is usually nonzero. In certain unusual situations, this number may be zero, and condition code 3 may be set with no progress. However, the CPU protects against endless reoccurrence of this no-progress case. The results in the first-operand location and the chaining-value field are unpredictable if any of the following situations occur:

1. The cryptographic-key field overlaps any portion of the first operand.
2. The chaining-value field overlaps any portion of the first operand or the second operand.
3. The first and second operands overlap destructively. Operands are said to overlap destructively when the first-operand location would be used as a source after data would have been moved into it, assuming processing to be performed from left to right and one byte at a time.

When the operation ends due to normal completion, condition code 0 is set and the resulting value in R2+1 is zero. When the operation ends due to partial completion, condition code 3 is set and the resulting value in R2+1 is nonzero.

When a storage-alteration PER event is recognized, fewer than 4K additional bytes are stored into the first-operand locations before the event is reported.

When the second-operand length is initially zero, the parameter block, first, and second operands are not accessed, general registers R1, R2, and R2+1 are not changed, and condition code 0 is set. When the contents of the R1 and R2 fields are the same, the contents of the designated registers are incremented only by the number of bytes processed, not by twice the number of bytes processed.

As observed by other CPUs and channel programs, references to the parameter block and storage operands may be multiple-access references, accesses to these storage locations are not necessarily block-concurrent, and the sequence of these accesses or references is undefined.

In certain unusual situations, instruction execution may complete by setting condition code 3 without updating the registers and chaining value to reflect the last unit of the first and second operands processed. The size of the unit processed in this case depends on the situation and the model, but is limited such that the portion of the first and second operands which have been processed and not reported do not overlap in storage. In all cases, change bits are set and PER storage-alteration events are reported, when applicable, for all first-operand locations processed.

Access exceptions may be reported for a larger portion of an operand than is processed in a single execution of the instruction; however, access exceptions are not recognized for locations beyond the length of an operand nor for locations more than 4K bytes beyond the current location being processed.

Symbols Used in Function Descriptions

The following symbols are used in the subsequent description of the CIPHER MESSAGE and CIPHER MESSAGE WITH CHAINING functions. For data-encryption-algorithm (DEA) functions, the DEA-key-parity bit in each byte of the DEA key is ignored, and the operation proceeds normally, regardless of the DEA-key parity of the key. Further description of the data-encryption algorithm may be found in Data Encryption Algorithm, ANSI-X3.92.1981, American National Standard for Information Systems.

FIG. 6 illustrates the symbol for the Bit-Wise Exclusive Or, FIG. 7 illustrates the symbols for DEA Encryption and Decryption.

KM-Query (KM Function Code 0)

The locations of the operands and addresses used by the instruction are as shown in FIG. 5.

Figure 8:
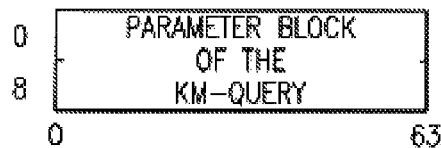
FIG. 8 illustrates the format for the parameter block of the KM-Query.

The parameter block used for the function KM-Query has the format shown in FIG. 8

A 128-bit status word is stored in the parameter block. Bits 0-127 of this field correspond to function codes 0-127, respectively, of the CIPHER MESSAGE instruction. When a bit is one, the corresponding function is installed; otherwise, the function is not installed.

Condition code 0 is set when execution of the KM-Query function completes; condition code 3 is not applicable to this function.

KM-DEA (KM Function Code 1)

The locations of the operands and addresses used by the instruction are as shown in FIG. 5.

Figure 9:
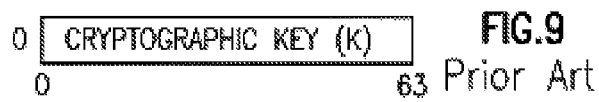
FIG. 9 illustrates the parameter block of KM-DEA according to Prior Art.

The parameter block used for the function KM-DEA has the format shown in FIG. 9.

Figure 10:
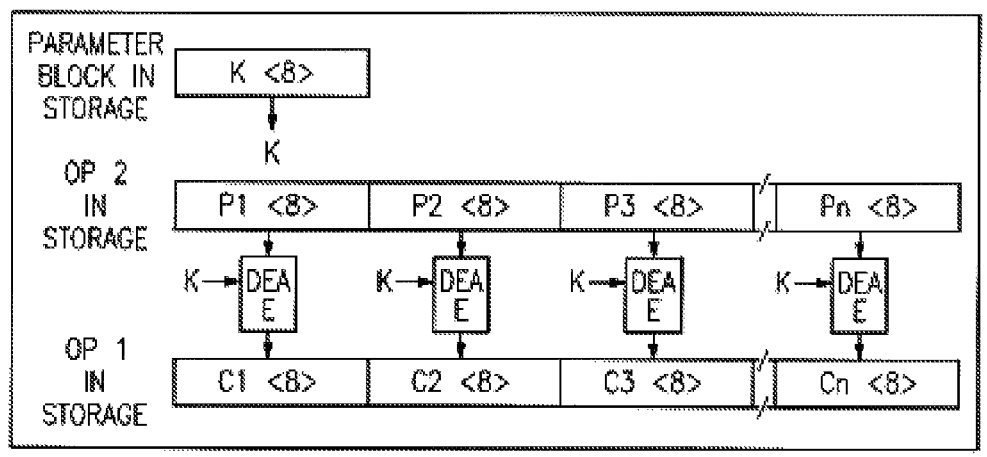
FIG. 10 illustrates the KM-DEA Encipher Operation according to Prior Art.

When the modifier bit in general register 0 is zero, an encipher operation is performed. The 8-byte plaintext blocks (P1, P2, . . . , Pn) in operand 2 are enciphered using the DEA algorithm with the 64-bit cryptographic key in the parameter block. Each plaintext block is independently enciphered; that is, the encipher operation is performed without chaining. The ciphertext blocks (C1, C2, . . . , Cn) are stored in operand 1. The operation is shown in FIG. 10.

Figure 11:
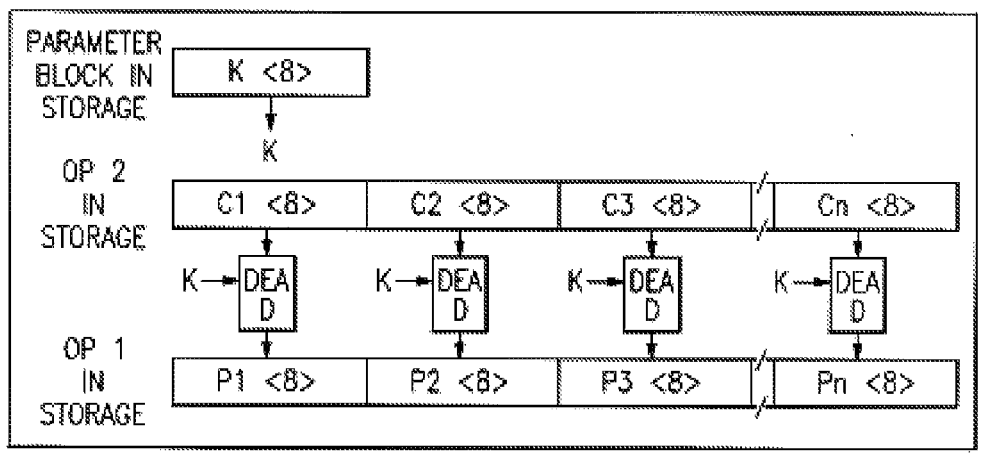
FIG. 11 illustrates the KM-DEA Decipher Operation according to Prior Art.

When the modifier bit in general register 0 is one, a decipher operation is performed. The 8-byte ciphertext blocks (C1, C2, . . . , Cn) in operand 2 are deciphered using the DEA algorithm with the 64-bit cryptographic key in the parameter block. Each ciphertext block is independently deciphered; that is, the decipher operation is performed without chaining. The plaintext blocks (P1, P2, . . . , Pn) are stored in operand 1. The KM-DEA decipher operation is shown in FIG. 11.

KM-TDEA-128 (KM Function Code 2)

Figure 12:
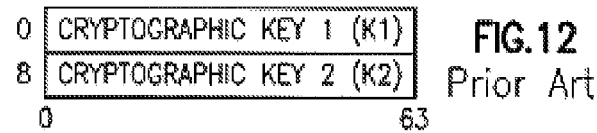
FIG. 12 illustrates the format for the parameter block for KM-TDA-128 according to Prior Art.

The locations of the operands and addresses used by the instruction are as shown in FIG. 5. The parameter block used for the KM-TDEA-128 function is shown in FIG. 12.

Figure 13:
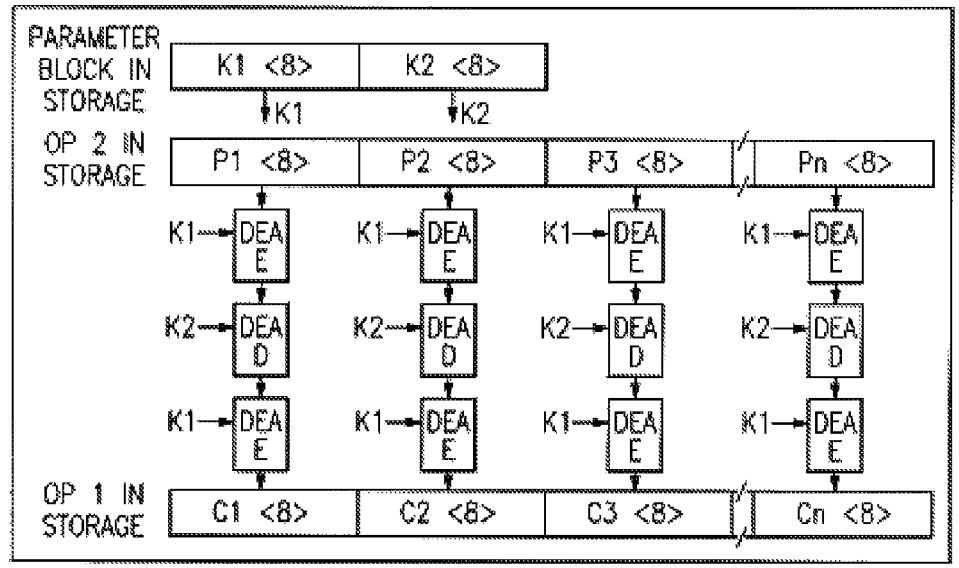
FIG. 13 illustrates the KM-TDEA-128 Encipher Operation according to Prior Art.

When the modifier bit in general register 0 is zero, an encipher operation is performed. The 8-byte plaintext blocks (P1, P2, . . . , Pn) in operand 2 are enciphered using the TDEA (triple DEA) algorithm with the two 64-bit cryptographic keys in the parameter block. Each plaintext block is independently enciphered; that is, the encipher operation is performed without chaining. The ciphertext blocks (C1, C2, . . . , Cn) are stored in operand 1. The KM-TDEA-128 encipher operation is shown in FIG. 13.

Figure 14:
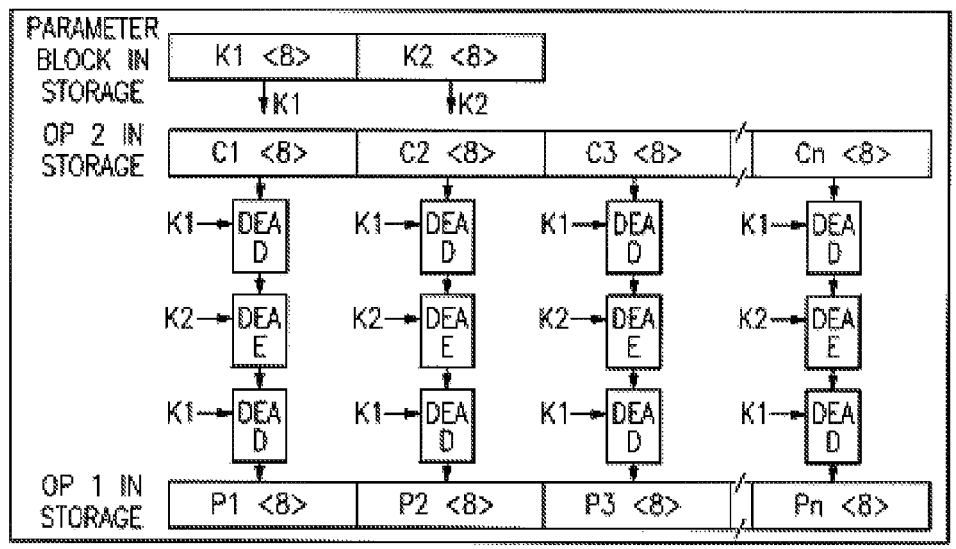
FIG. 14 illustrates the KM-TDEA-128 Decipher Operation according to Prior Art.

When the modifier bit in general register 0 is one, a decipher operation is performed. The 8-byte ciphertext blocks (C1, C2, . . . , Cn) in operand 2 are deciphered using the TDEA algorithm with the two 64-bit cryptographic keys in the parameter block. Each ciphertext block is independently deciphered; that is, the decipher operation is performed without chaining. The plaintext blocks (P1, P2, . . . , Pn) are stored in operand 1. The KM-TDEA-128 decipher operation is shown in FIG. 14.

KM-TDEA-192 (KM Function Code 3)

The locations of the operands and addresses used by the instruction are as shown in FIG. 5.

The parameter block used for the KM-TDEA-192 function has the format shown in FIG. 15.

When the modifier bit in general register 0 is zero, an encipher operation is performed. The 8-byte plaintext blocks (P1, P2, . . . , Pn) in operand 2 are enciphered using the TDEA algorithm with the three 64-bit cryptographic keys in the parameter block. Each plaintext block is independently enciphered; that is, the encipher operation is performed without chaining. The ciphertext blocks (C1, C2, . . . , Cn) are stored in operand 1. The KM-TDEA-192 encipher operation is shown in FIG. 16.

When the modifier bit in general register 0 is one, a decipher operation is performed. The 8-byte ciphertext blocks (C1, C2, . . . , Cn) in operand 2 are deciphered using the TDEA algorithm with the three 64-bit cryptographic keys in the parameter block. Each ciphertext block is independently deciphered; that is, the decipher operation is performed without chaining. The plaintext blocks (P1, P2, . . . , Pn) are stored in operand 1. The KM-TDEA-192 decipher operation is shown in FIG. 17.

KMC-Query (KMC Function Code 0)

The locations of the operands and addresses used by the instruction are as shown in FIG. 5.

Figure 18:
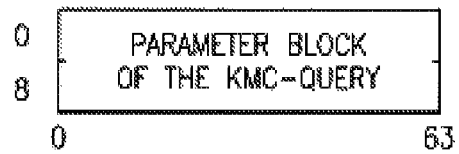
FIG. 18 illustrates the format for the parameter block for KMC-Query.

The parameter block used for the KMC-Query function has the format shown in FIG. 18.

A 128-bit status word is stored in the parameter block. Bits 0-127 of this field correspond to function codes 0-127, respectively, of the CIPHER MESSAGE WITH CHAINING instruction. When a bit is one, the corresponding function is installed; otherwise, the function is not installed.

Condition code 0 is set when execution of the KMC-Query function completes; condition code 3 is not applicable to this function.

KMC-DEA (KMC Function Code 1)

The locations of the operands and addresses used by the instruction are as shown in FIG. 5.

Figure 19:
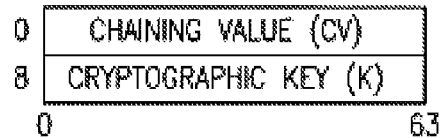
FIG. 19 illustrates the format for the parameter block for KMC-DEA according to Prior Art.

The parameter block used for the KMC-DEA function has the format shown in FIG. 19.

When the modifier bit in general register 0 is zero, an encipher operation is performed. The 8-byte plaintext blocks (P1, P2, . . . , Pn) in operand 2 are enciphered using the DEA algorithm with the 64-bit cryptographic key and the 64-bit chaining value in the parameter block.

Figure 20:
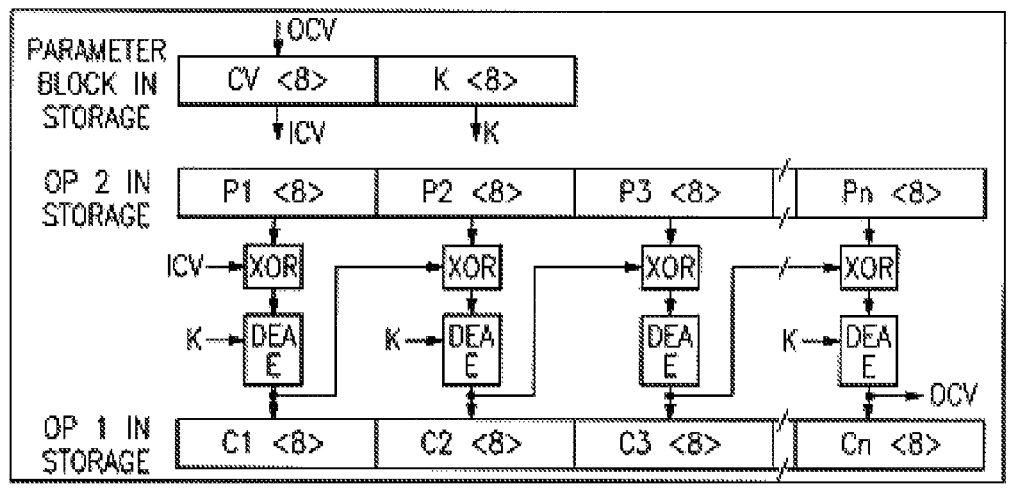
FIG. 20 illustrates the KMC-DEA Encipher Operation according to Prior Art.

The chaining value, called the initial chaining value (ICV), for deriving the first ciphertext block is the chaining value in the parameter block; the chaining value for deriving each subsequent ciphertext block is the corresponding previous ciphertext block. The ciphertext blocks (C1, C2, . . . , Cn) are stored in operand 1. The last ciphertext block is the output chaining value (OCV) and is stored into the chaining-value field of the parameter block. The KMC-DEA encipher operation is shown in FIG. 20.

When the modifier bit in general register 0 is one, a decipher operation is performed. The 8-byte ciphertext blocks (C1, C2, . . . , Cn) in operand 2 are deciphered using the DEA algorithm with the 64-bit cryptographic key and the 64-bit chaining value in the parameter block.

Figure 21:
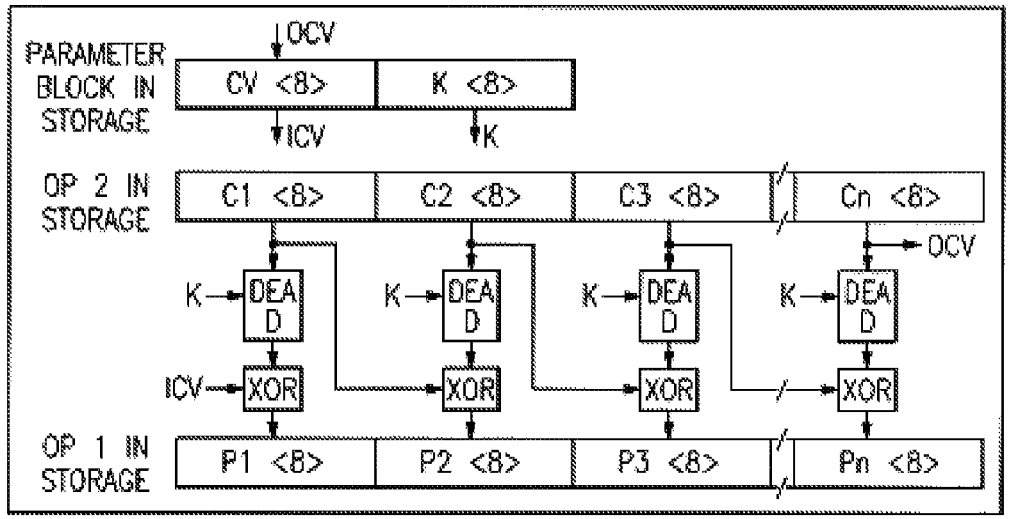
FIG. 21 illustrates the KMC-DEA Decipher Operation according to Prior Art.

The chaining value, called the initial chaining value (ICV), for deriving the first plaintext block is in the parameter block; the chaining value for deriving each subsequent plaintext block is the corresponding previous ciphertext block. The plaintext blocks (P1, P2, . . . , Pn) are stored in operand 1. The last ciphertext block is the output chaining value (OCV) and is stored into the chaining-value field in the parameter block. The KMC-DEA decipher operation is shown in FIG. 21.

KMC-TDEA-128 (KMC Function Code 2)

The locations of the operands and addresses used by the instruction are as shown in FIG. 5.

Figure 22:
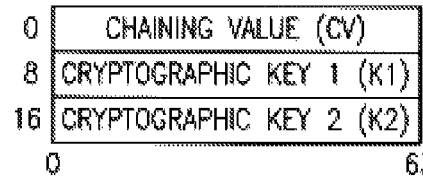
FIG. 22 illustrates the format for the parameter block for KMC-TDEA-128 according to Prior Art.

The parameter block used for the KMC-TDEA-128 function has the format shown in FIG. 22.

When the modifier bit in general register 0 is zero, an encipher operation is performed. The 8-byte plaintext blocks (P1, P2, . . . , Pn) in operand 2 are enciphered using the TDEA algorithm with the two 64-bit cryptographic keys and the 64-bit chaining value in the parameter block.

Figure 23:
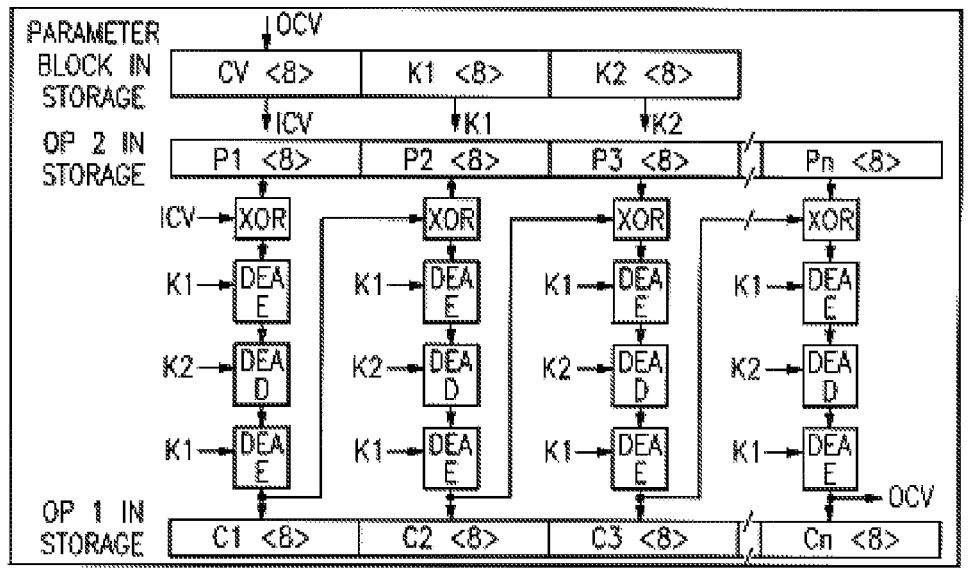
FIG. 23 illustrates the KMC-TDEA-128 Encipher Operation according to Prior Art.

The chaining value, called the initial chaining value (ICV), for deriving the first ciphertext block is the chaining value in the parameter block; the chaining value for deriving each subsequent ciphertext block is the corresponding previous ciphertext block. The ciphertext blocks (C1, C2, . . . , Cn) are stored in operand 1. The last ciphertext block is the output chaining value (OCV) and is stored into the chaining-value field of the parameter block. The KMC-TDEA-128 encipher operation is shown in FIG. 23.

When the modifier bit in general register 0 is one, a decipher operation is performed. The 8-byte ciphertext blocks (C1, C2, . . . , Cn) in operand 2 are deciphered using the TDEA algorithm with the two 64-bit cryptographic keys and the 64-bit chaining value in the parameter block.

Figure 24:
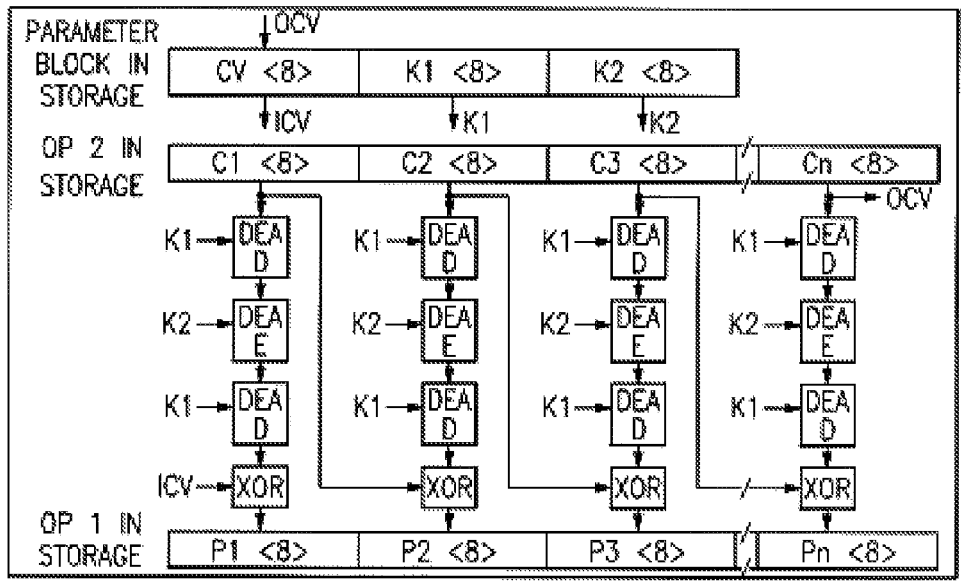
FIG. 24 illustrates the KMC-TDEA-128 Decipher Operation according to Prior Art.

The chaining value, called the initial chaining value (ICV), for deriving the first plaintext block is in the parameter block; the chaining value for deriving each subsequent plaintext block is the corresponding previous ciphertext block. The plaintext blocks (P1, P2, . . . , Pn) are stored in operand 1. The last ciphertext block is the output chaining value (OCV) and is stored into the chaining-value field in the parameter block. The KMC-TDEA-128 operation is shown in FIG. 24.

KMC-TDEA-192 (KMC Function Code 3)

70 The locations of the operands and addresses used by the instruction are as shown in FIG. 5.

71 The parameter block used for the KMC-TDEA-192 function has the format shown in FIG. 25.

72 When the modifier bit in general register 0 is zero, an encipher operation is performed. The 8-byte plaintext blocks (P1, P2, . . . , Pn) in operand 2 are enciphered using the TDEA algorithm with the three 64-bit cryptographic keys and the 64-bit chaining value in the parameter block.

Figure 26:
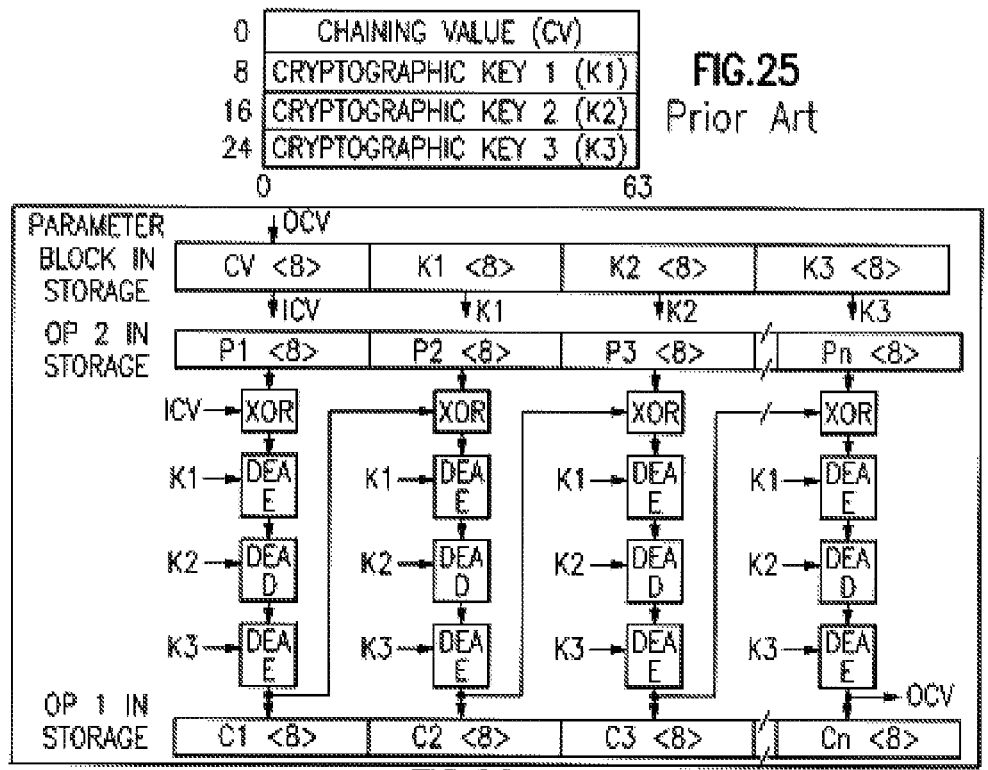
FIG. 26 illustrates the KMC-TDEA-192 Encipher Operation according to Prior Art.

73 The chaining value, called the initial chaining value (ICV), for deriving the first ciphertext block is the chaining value in the parameter block; the chaining value for deriving each subsequent ciphertext block is the corresponding previous ciphertext block. The ciphertext blocks (C1, C2, . . . , Cn) are stored in operand 1. The last ciphertext block is the output chaining value (OCV) and is stored into the chaining-value field of the parameter block. The KMC-TDEA-192 encipher operation is shown in FIG. 26.

74 When the modifier bit in general register 0 is one, a decipher operation is performed. The 8-byte ciphertext blocks (C1, C2, . . . , Cn) in operand 2 are deciphered using the TDEA algorithm with the three 64-bit cryptographic keys and the 64-bit chaining value in the parameter block.

Figure 27:
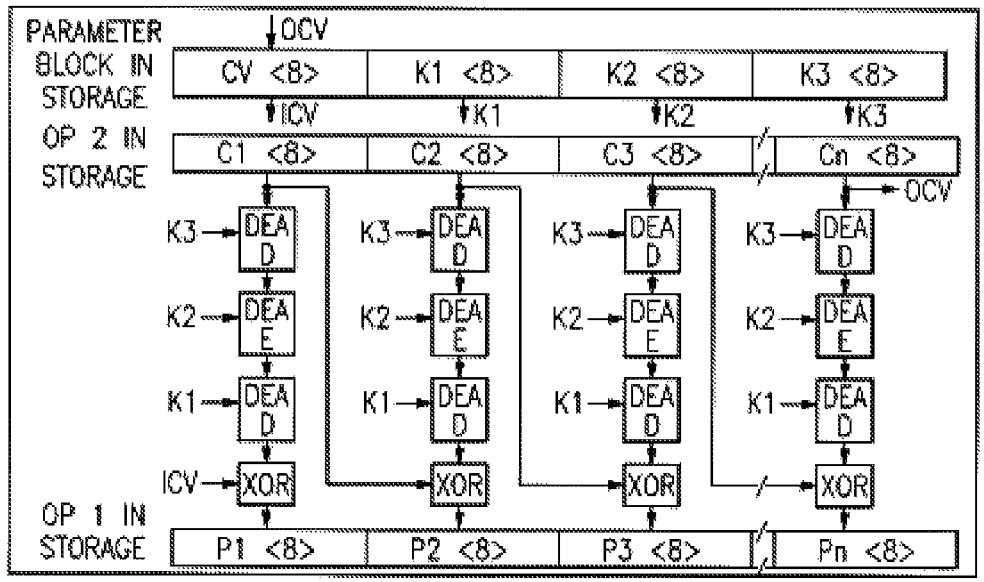
FIG. 27 illustrates the KMC-TDEA-192 Decipher Operation according to Prior Art.

75 The chaining value, called the initial chaining value (ICV), for deriving the first plaintext block is in the parameter block; the chaining value for deriving each subsequent plaintext block is the corresponding previous ciphertext block. The plaintext blocks (P1, P2, . . . , Pn) are stored in operand 1. The last ciphertext block is the output chaining value (OCV) and is stored into the chaining-value field in the parameter block. The KMC-TDEA-192 decipher operation is shown in FIG. 27.

Special Conditions for KM and KMC

76 A specification exception is recognized and no other action is taken if any of the following occurs:

1. Bits 57-63 of general register 0 specify an unassigned or uninstalled function code.
2. The R1 or R2 field designates an odd-numbered register or general register 0.
3. The second operand length is not a multiple of the data block size of the designated function (see FIG. 3 to determine the data block sizes for CIPHER MESSAGE functions; see FIG. 4 to determine the data block sizes for CIPHER MESSAGE WITH CHAINING functions). This specification-exception condition does not apply to the query functions.

Resulting Condition Code:
0 Normal completion
1—
2—
3 Partial completion

Program Exceptions:

Access (fetch, operand 2 and cryptographic key; store, operand 1; fetch and store, chaining value)

Operation (if the message-security assist is not installed)

Specification

FIG. 28 is a table showing the priority of execution of KM and KMC.

Programming Notes:

When condition code 3 is set, the general registers containing the operand addresses and length, and, for CIPHER MESSAGE WITH CHAINING, the chaining value in the parameter block, are usually updated such that the program can simply branch back to the instruction to continue the operation.

For unusual situations, the CPU protects against endless reoccurrence of the no-progress case and also protects against setting condition code 3 when the portion of the first and second operands to be reprocessed overlap in storage. Thus, the program can safely branch back to the instruction whenever condition code 3 is set with no exposure to an endless loop and no exposure to incorrectly retrying the instruction.

If the length of the second operand is nonzero initially and condition code 0 is set, the registers are updated in the same manner as for condition code 3. For CIPHER MESSAGE WITH CHAINING, the chaining value in this case is such that additional operands can be processed as if they were part of the same chain.

To save storage, the first and second operands may overlap exactly or the starting point of the first operand may be to the left of the starting point of the second operand. In either case, the overlap is not destructive.

Crypto Coprocessor:

The preferred embodiment provides a crypto coprocessor which can be used with the instructions described herein and to execute cipher messages and assist in a variety of chaining message tasks which can be employed for chained and cryptographic use with the appropriate instructions.

Figure 29:
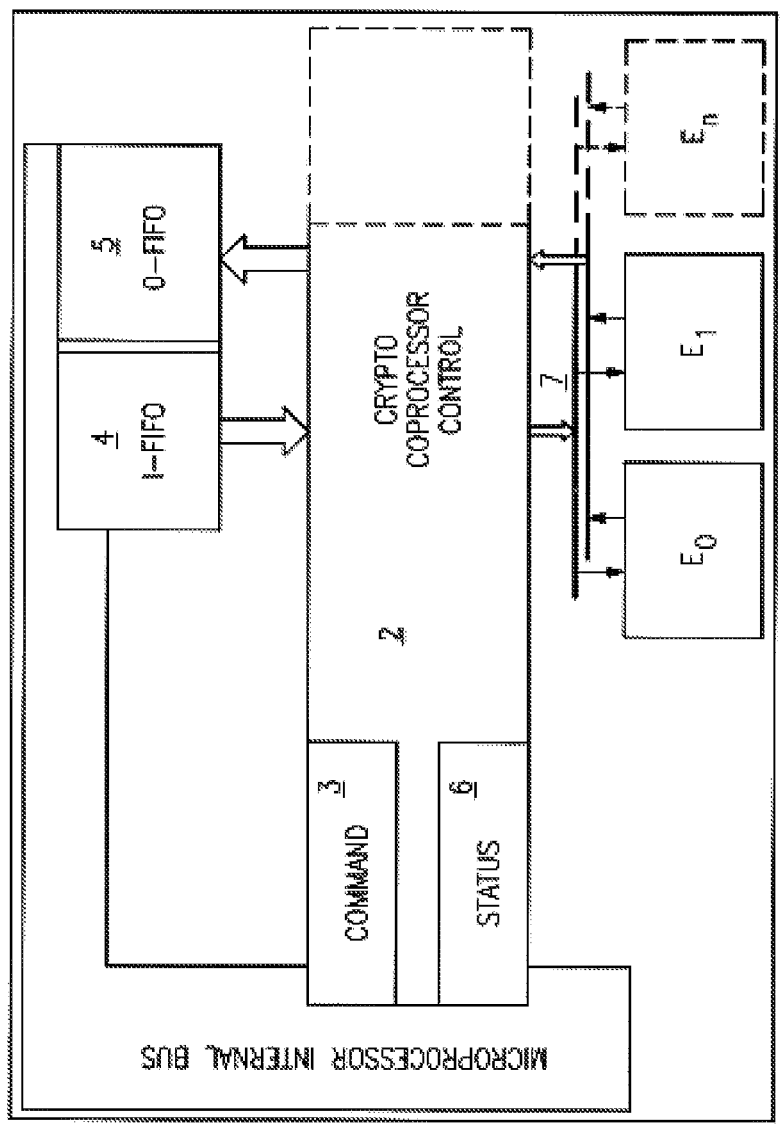
FIG. 29 illustrates our cryptographic coprocessor.

FIG. 29 illustrates our cryptographic coprocessor which is directly attached to a data path common to all internal execution units on the general purpose microprocessor, which has multiple execution pipelines. The microprocessor internal bus (1) is common to all other execution units is attached to the cryptographic control unit (2), and the control unit watches the bus for processor instructions that it should execute.

The cryptographic control unit provides a cryptographic coprocessor directly attached to a data path common to all internal execution units of the central processing unit on a general purpose microprocessor providing the available hardware ($E_0 \ldots E_n$), or from a combination thereof in the preferred embodiment having multiple execution pipelines) for the central processing unit. When a cryptographic instruction is encountered in the command register (3), the control unit (2) invokes the appropriate algorithm from the available hardware. Operand data is delivered over the same internal microprocessor bus via an input FIFO register (4). When an operation is completed the a flag is set in a status register (6) and the results are available to be read out from the output FIFO register (5).

The illustrated preferred embodiment of our invention is designed to be extensible to include as many hardware engines as required by a particular implementation depending on the performance goals of the system. The data paths to the input and output registers (7) are common among all engines.

The preferred embodiment of the invention cryptographic functions are implemented in execution unit hardware on the CPU and this implementation enables a lower latency for calling and executing encryption operations and increases the efficiency.

This decreased latency greatly enhances the capability of general purpose processors in systems that frequently do many encryption operations, particularly when only small amounts of data are involved. This allows an implementation that can significantly accelerate the processes involved in doing secure online transactions. The most common methods of securing online transactions involve a set of three algorithms. The first algorithm is only used one time in a session, and may be implemented in hardware or software, while the other operations are invoked with every transaction of the session, and the cost in latency of calling external hardware as well as the cost in time to execute the algorithm in software are both eliminated with this invention.

Figure 30:
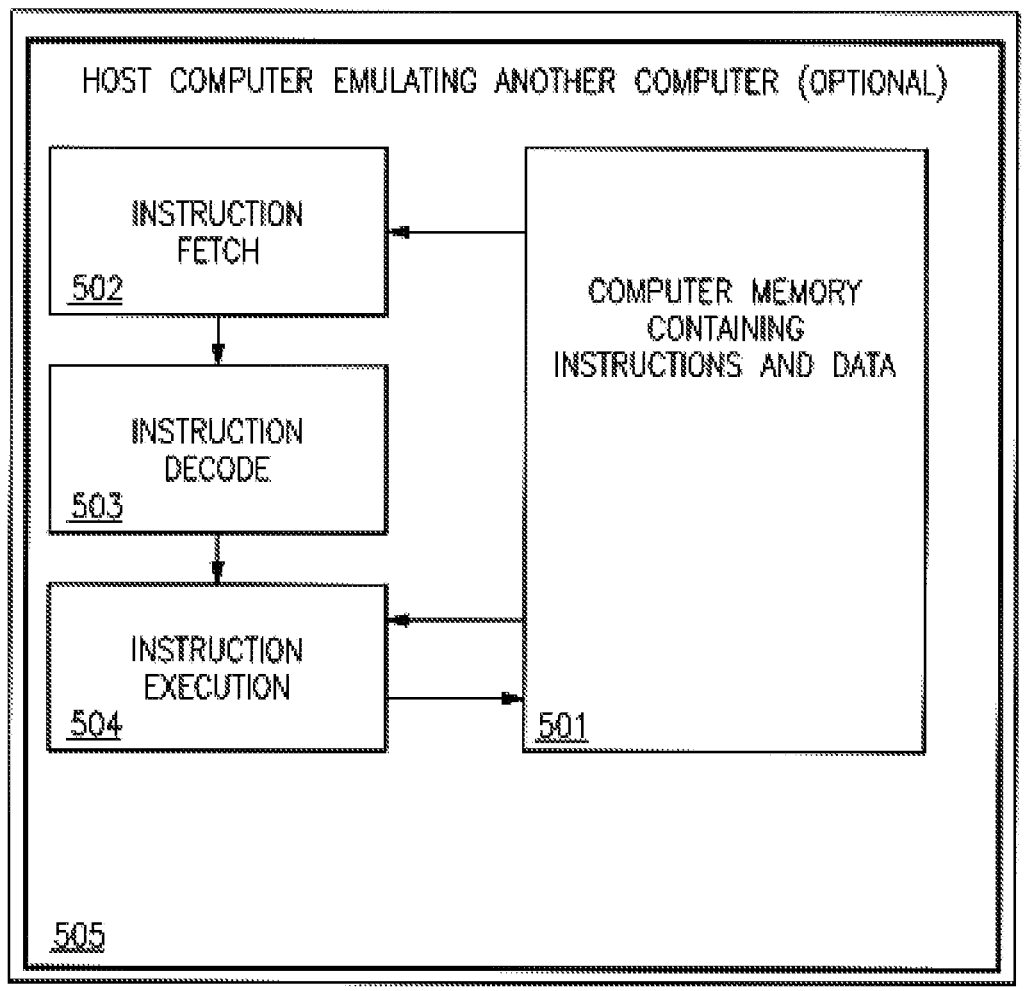
FIG. 30 shows the generalized preferred embodiment of a computer memory storage containing instructions in accordance with the preferred embodiment and data, as well as the mechanism for fetching, decoding and executing these instructions, either on a computer system employing these architected instructions or as used in emulation of our architected instructions according to Prior Art.

In FIG. 30 we have shown conceptually how to implement what we have in a preferred embodiment implemented in a mainframe computer having the microprocessor described above which can effectively be used, as we have experimentally proven within IBM, in a commercial implementation of the long displacement facility computer architected instruction format the instructions are used by programmers, usually today "C" programmers. These instruction formats stored in the storage medium may be executed natively in a Z/Architecture IBM Server, or alternatively in machines executing other architectures. They can be emulated in the existing and in future IBM mainframe servers and on other machines of IBM (e.g. pSeries Servers and xSeries Servers). They can be executed in machines running Linux on a wide variety of machines using hardware manufactured by IBM, Intel, AMD, Sun Microsystems and others. Besides execution on that hardware under a Z/Architecture, Linux can be used as well as machines which use emulation by Hercules, UMX, FXI or Platform Solutions, where generally execution is in an emulation mode. In emulation mode the specific instruction being emulated is decoded, and a subroutine built to implement the individual instruction, as in a "C" subroutine or driver, or some other method of providing a driver for the specific hardware as is within the skill of those in the art after understanding the description of the preferred embodiment. Various software and hardware emulation patents including, but not limited to U.S. Pat. No. 5,551,013 for a "Multiprocessor for hardware emulation" of Beausoleil et al., and U.S. Pat. No. 6,009,261: Preprocessing of stored target routines for emulating incompatible instructions on a target processor" of Scalzi et al; and U.S. Pat. No. 5,574,873: Decoding guest instruction to directly access emulation routines that emulate the guest instructions, of Davidian et al; U.S. Pat. No. 6,308,255: Symmetrical multiprocessing bus and chipset used for coprocessor support allowing non-native code to run in a system, of Gorishek et al; and U.S. Pat. No. 6,463,582: Dynamic optimizing object code translator for architecture emulation and dynamic optimizing object code translation method of Lethin et al; and U.S. Pat. No. 5,790,825: Method for emulating guest instructions on a host computer through dynamic recompilation of host instructions of Eric Traut; and many others, illustrate the a variety of known ways to achieve emulation of an instruction format architected for a different machine for a target machine available to those skilled in the art, as well as those commercial software techniques used by those referenced above.

As illustrated by FIG. 30, these instructions are executed in hardware by a processor or by emulation of said instruction set by software executing on a computer having a different native instruction set.

In FIG. 30, #501 shows a computer memory storage containing instructions and data. The instructions described in this invention would initially stored in this computer. #502 shows a mechanism for fetching instructions from a computer memory and may also contain local buffering of these instructions it has fetched. Then the raw instructions are transferred to an instruction decoder, #503, where it determines what type of instruction has been fetched. #504, shows a mechanism for executing instructions. This may include loading data into a register from memory, #501, storing data back to memory from a register, or performing some type of arithmetic or logical operation. This exact type of operation to be performed has been previously determined by the instruction decoder. The instructions described in this invention would be executed here. If the instructions are being executed natively on a computer system, then this diagram is complete as described above. However, if an instruction set architecture, is being emulated on another computer, the above process would be implemented in software on a host computer, #505. In this case, the above stated mechanisms would typically be implemented as one or more software subroutines within the emulator software. In both cases an instruction is fetched, decoded and executed.

As illustrated by FIG. 30, these instructions are executed in hardware by a processor or by emulation of said instruction set by software executing on a computer having a different native instruction set.

Furthermore, the preferred computer architecture has an instruction format such that the opcode is in bit positions 0 through 15.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. A computer program product for executing a multi-function instruction for performing a multi-function operation in a computer system, the computer program product comprising:
   a non-transitory storage medium readable by a processor storing instructions for execution by the processor and the processor comprising an instruction fetching element for fetching instructions from memory of a first computer architecture and executed by the processor of an alternate computer architecture and one or more execution elements for interpreting the fetched instructions to identify a predetermined software subroutine for emulating the operation of the fetched instructions, the predetermined software subroutine comprising a plurality of instructions; and executing the predetermined software subroutine to perform:
   configuring a processor of a computer system to execute the multi-function instruction, the multi-function instruction configured to perform a multi-function operation, the processor configured to perform a method comprising:
   1) responsive to the multi-function operation to be performed being a function query operation, performing a) and b), comprising:
      a) determining, by the processor, for each of one or more multi-function operations whether a corresponding multi-function function is installed on the computer system for execution by a multi-function instruction; and
      b) saving, by the processor, a status word, the status word comprising one or more status word bits, each one of the one or more status word bits indicating whether a corresponding multi-function function is installed on the computer system, each one of the one or more status word bits having a position in the status word corresponding to the corresponding multi-function function; and
   2) responsive to the multi-function operation to be performed being a multi-function operation other than a function query operation, performing, by the processor, the multi-function operation; and
   3) providing the processor of the computer system, which has been configured, to execute the multi-function instruction.

2. The computer program product according to claim 1, wherein performing 2) further comprises:
   obtaining an encryption key; and
   performing an encryption operation on data identified by the multi-function instruction.

3. The computer program product according to claim 1, wherein performing 2) further comprises:
   obtaining an encryption key; and
   performing a decryption operation on data identified by the multi-function instruction.

4. The computer program product according to claim 1, wherein the multi-function instruction has a format native to a machine instruction architecture of the computer system.

5. The computer program product according to claim 1, wherein—responsive to the multi-function instruction not being native to a machine instruction architecture of the computer system, the method further comprises:
   interpreting the multi-function instruction to identify a software routine for emulating the operation of the multi-function instruction, the software routine comprising a plurality of instructions; and
   executing the software routine.

6. A computer program product for executing a multi-function instruction for performing a multi-function operation in a computer system, the computer program product comprising:
   a non-transitory storage medium readable by a processor storing instructions for execution by the processor and the processor comprising an instruction fetching element for fetching instructions from memory of a first computer architecture and executed by the processor of an alternate computer architecture and one or more execution elements for interpreting the fetched instructions to identify a predetermined software subroutine for emulating the operation of the fetched instructions, the predetermined software subroutine comprising a plurality of instructions; and executing the predetermined software subroutine to perform:

building the software routine to emulate execution of the multi-function instruction of a first computer architecture on a general purpose processor (GPA) of an alternate computer architecture, the multi-function instruction configured to perform a multi-function operation, the software routine comprising a plurality of instructions, the software routine configured to cause the general purpose processor of the alternate computer architecture to perform a method comprising:

1) responsive to the multi-function operation to be performed being a function query operation, performing a) and b), comprising:
   a) determining, by the GPA, for each of one or more multi-function operations whether a corresponding multi-function function is installed on a computer system for execution by a multi-function instruction; and
   b) saving, by the GPA, a status word, the status word comprising one or more status word bits, each one of the one or more status word bits indicating whether a corresponding multi-function function is installed on the computer system, each one of the one or more status word bits having a position in the status word corresponding to the corresponding multi-function function; and
2) responsive to the multi-function operation to be performed being a multi-function operation other than a function query operation, performing, by the GPA, the multi-function operation; and 3) storing, by a processor, the software routine on a computer readable tangible storage media; and
4) providing the computer readable tangible storage media having the software routine, for use by the general purpose processor of an alternate computer architecture.

7. The computer program product according to claim 6, wherein performing 2) further comprises:
   obtaining an encryption key; and
   performing an encryption operation on data identified by the multi-function instruction.

8. The computer program product according to claim 6, wherein performing 2) further comprises:
   obtaining an encryption key; and
   performing a decryption operation on data identified by the multi-function instruction.

9. The computer program product according to claim 6, wherein the multi-function instruction has a format native to a machine instruction architecture of the computer system.

10. The computer program product according to claim 6, wherein—responsive to the multi-function instruction not being native to a machine instruction architecture of the computer system, the method further comprises:
   interpreting the multi-function instruction to identify a software routine for emulating the operation of the multi-function instruction, the software routine comprising a plurality of instructions; and
   executing the software routine.

* * * * *